United States Patent [19]

Kimura

[11] Patent Number: 5,777,713
[45] Date of Patent: Jul. 7, 1998

[54] LIQUID CRYSTAL DISPLAY UNIT WITH SPACERS FORM IN THE LIGHT SHIELDING REGIONS

[75] Inventor: Atsuo Kimura, Ohtsu, Japan

[73] Assignee: International Business Machines Corporation, Armonk, N.Y.

[21] Appl. No.: 666,682

[22] Filed: Jun. 17, 1996

[51] Int. Cl.⁶ .................. G02F 1/1333; G02F 1/1339
[52] U.S. Cl. .................. 349/156; 153/157; 153/60
[58] Field of Search ................ 349/153, 60, 155, 349/156

[56] References Cited

U.S. PATENT DOCUMENTS

| | | | |
|---|---|---|---|
| 5,037,185 | 8/1991 | Grupp | 349/153 |
| 5,517,344 | 5/1996 | Hu et al. | 349/153 |
| 5,556,670 | 9/1996 | Mihara et al. | 349/153 |

FOREIGN PATENT DOCUMENTS

| | | | |
|---|---|---|---|
| 404243229 A | 8/1992 | Japan | 349/153 |
| 404371926 A | 12/1992 | Japan | 349/153 |
| 405005890 A | 1/1993 | Japan | 349/153 |
| 405072540 A | 3/1993 | Japan | 349/153 |

*Primary Examiner*—William L. Sikes
*Assistant Examiner*—Julie Ngo
*Attorney, Agent, or Firm*—Scully, Scott, Murphy & Presser

[57] ABSTRACT

A liquid crystal display is disclosed having a substrate on which a pixel array region is formed. The pixel array region includes display electrodes. The display further includes a transparent counter substrate over which a transparent electrode is formed. The transparent electrode faces the pixel array on opposite side of the display electrodes. Spacers are formed on the outside region of the pixel array. Alternatively, the spacers are formed in light shielding regions of the pixel array in a width smaller than the width of the light shielding regions. The spacers are formed of a photo sensitive material having adhesive properties. The spacers bond the substrate to the transparent counter substrate and maintain a prescribed cell gap.

4 Claims, 3 Drawing Sheets

LIQUID CRYSTAL DISPLAY UNIT WITH SPACERS FORM IN THE LIGHT SHIELDING REGIONS

BACKGROUND OF THE INVENTION

1. Technical Field

The present invention relates to a liquid crystal display unit, and more specifically, to a liquid crystal light valve used in projection-type liquid crystal display units.

2. Prior Art

In recent years, a projection type of liquid crystal display unit has assumed a new prominence as a potential ultra-high definition display unit which replaces CRTs. The projection type of liquid crystal display unit has already been used in HDTV, OHP displays and other industrial applications.

The projection optical system of the projection type liquid crystal display unit consists of a light source, light valves, a screen, optical filters, and projection lenses. Liquid crystal display panels are used as the light valves. Light valves are classified into a transmissive type liquid crystal light valve, which transmits light from the light source and projects images on the screen, and a reflection type liquid crystal light valve, which reflects light from the light source at pixel arrays and projects images on the screen.

Not only the projection type, but a liquid crystal display unit in general of the active matrix type consists of pixel array substrate on which switching elements and display electrodes connected to the switching elements, and a counter substrate on which a counter electrode facing to the array substrate with a predetermined distance (cell gap) from the array substrate. Between the array substrate and the counter substrate, liquid crystals are enclosed.

Since the wavelength as well as electro-optical properties light transmitted or reflected through the liquid crystal layer are dependent on the cell gap, the thickness accuracy and uniformity over the pixel array are critical parameters for the performance of a liquid crystal display unit (LCD).

FIGS. 5 and 6 show the structure of a reflection type liquid crystal light valve used in conventional projection type liquid crystal display units. A pixel array region 4, on which display electrodes consisting of a thin aluminum (Al) film and having functions as a light reflecting film are formed for each pixel, is formed on the silicon substrate 2. A counter electrode 16 is provided on the counter substrate such as a glass substrate 14. The silicon substrate 2 is bonded face to face to the glass substrate 14 using a sealant 30, and liquid crystals 18 are enclosed in the region between the pixel array region 4 and the counter electrode 16. Although the orientation films to align the liquid crystal molecules 18 is not shown, they are formed on the pixel array region 4 and the counter electrode 16 of the sides contacting the liquid crystals.

In order to achieve desired electro-optical properties of the liquid crystals, the predetermined cell gap must be maintained uniformly over the entire area of pixel array of the panel. For this, some display units use a large number of glass or Resin beads 32 having a diameter of several microns dispersed in the region between the pixel array region 4 and the counter electrode 16 as spacers to make the cell gap even (FIG. 5). However, this method of using spacer beads 32 has problems of the uniformity in the diameter of spacer beads 32 and difficulty in the even dispersion of spacer beads 32 on the panel, as well as nonuniform orientation and decrease in brightness and/or optical aperture depending on the location of spacers 32 on pixel array region 4.

Instead of the above spacer bead dispersion method, a method of forming columns consisting of an insulator film and the like in the cell gap as spacers has been proposed (FIG. 6). In this method, columns of a silicon oxide film are formed in the region between the pixel array region 4 and the counter electrode 16 as spacers (columnar spacers 34) to form a prescribed cell gap by using photolithography commonly used in the manufacturing process of semiconductor devices. This method is advantageous compared with the conventional method using spacer beads in that the location, number and height of the spacers may be controlled freely.

In the reflection type liquid crystal light valve shown in FIG. 6, however, columnar spacers 34 override nearby pixel arrays and form difference in levels (not shown) to decrease the light reflecting area of the Al light reflecting film, reducing the optical aperture of subpixels.

Since this difference in height also causes the edge of columnar spacers 34 higher, which makes load tends to be concentrated at these corners during cell processing, and the columns of spacers 34 are susceptible to break.

Furthermore, since these columnar spacers are formed before the orientation process of the orientation films, they interfere with rubbing, and the liquid crystal molecules close to the spacer columns may not be properly oriented.

Since spacer beads or spacer columns are present in the pixel array region, they disturb the orientation of liquid crystals molecules near the spacers, and become visible when the LCD is activated. The disturbance of liquid crystal orientation is enlarged and projected, and becomes more serious with increase in the size of the display screen in higher definition, larger screen projectors. This causes the degradation of display qualities, and must be solved.

SUMMARY OF THE INVENTION

It is an object of the present invention to provide a liquid crystal display unit of improved display qualities by preventing uneven or poor orientation caused by the disturbance of spacers, and to provide a projection type liquid crystal display unit of improved display qualities by increasing brightness and preventing uneven or poor orientation due to the disturbance by spacers.

The above object is achieved by a liquid crystal display unit comprising a substrate on which a pixel array region having a plurality of display electrodes are formed, a transparent counter substrate on which a transparent electrode facing to said pixel array region is formed, and spacers formed on the outside immediate to said pixel array region on said substrate and adopted to bond said substrate to said transparent counter substrate maintaining a prescribed cell gap.

Furthermore, the above object is achieved by a liquid crystal display unit, wherein said spacers are formed as a plurality of narrow walls in parallel in the outside immediate to said pixel array region.

Also, the above object is achieved by a liquid crystal display unit, wherein the most external wall of said spacers is also used as sealants for sealing liquid crystals.

The above object is achieved by a liquid crystal display unit comprising a substrate having a plurality of display electrodes, on which a pixel array region having light shielding regions between said display electrodes, a transparent counter substrate on which a transparent electrode facing to said pixel array region is formed, and spacers formed in said light shielding regions on said substrate in a width smaller than the width of said light shielding regions, and adopted to bond said substrate to said transparent counter substrate maintaining a prescribed cell gap.

Furthermore, the above object is achieved by a liquid crystal display unit, wherein said spacers are formed of a photo sensitive material having adhesive properties.

Furthermore, the above object is achieved by a liquid crystal display unit, wherein said substrate is a silicon substrate, and said display electrodes are formed of a light reflecting material.

According to the present invention, since spacers for bonding the substrate with the transparent counter substrate maintaining a prescribed cell gap on the outside immediate to the pixel array region on the substrate, the display brightness of the liquid crystal display unit is enhanced, and the display qualities are improved by preventing uneven or poor orientation of liquid crystal molecules.

Also, since spacers for bonding the substrate with the transparent counter substrate maintaining a prescribed cell gap and having a width smaller than the width of the light shielding regions, on the light shielding regions of the substrate, the display brightness of the liquid crystal display unit is enhanced, and the display qualities are improved by preventing uneven or poor orientation.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

A reflection type liquid crystal light valve and a method for the manufacture thereof according to an embodiment of the present invention will be described referring to FIGS. 1–8.

Figure 1:
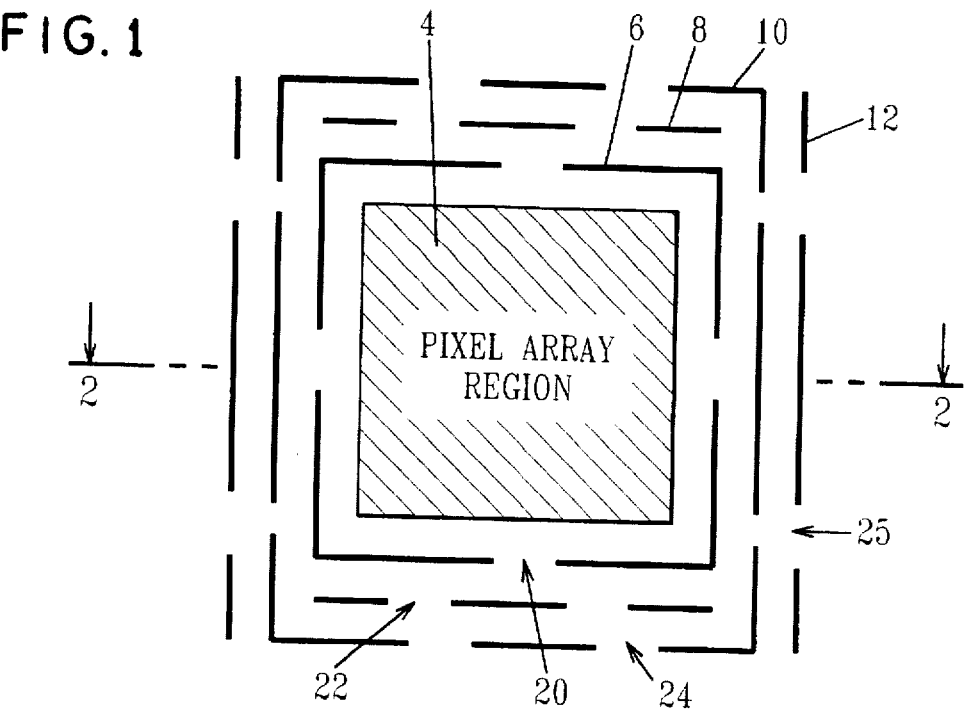
FIG. 1 is a top view showing a reflection type liquid crystal light valve according to an embodiment of the present invention.
Figure 2:
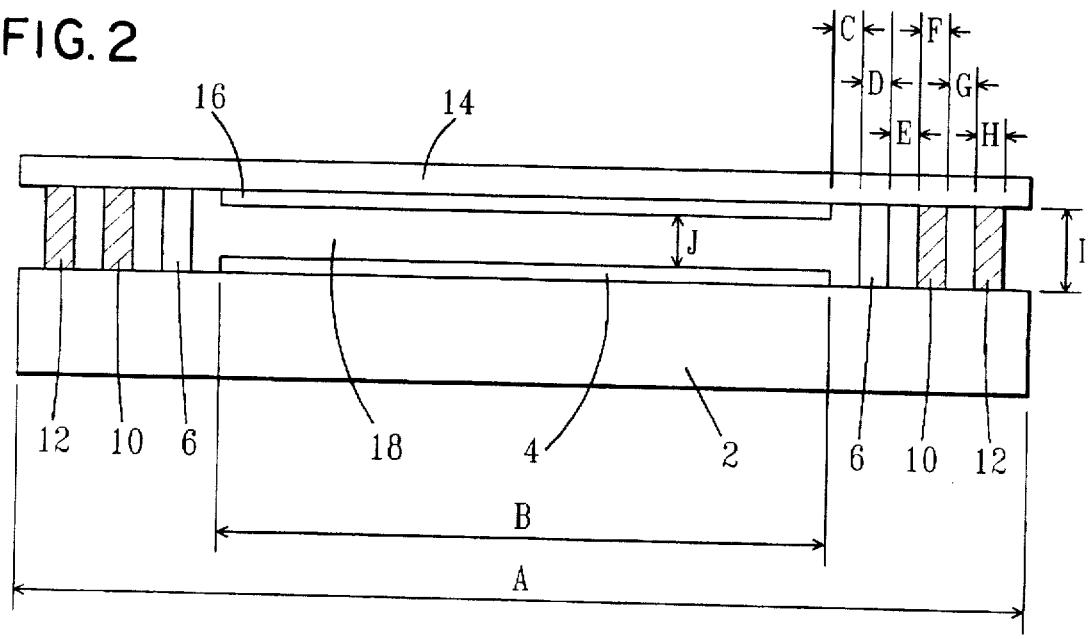
FIG. 2 is a sectional view along the line AA—AA of a reflection type liquid crystal light valve according to an embodiment of the present invention.

First, the structure of the reflection type liquid crystal light valve will be described referring to FIGS. 1 and 2. FIG. 1 is a top view of the reflection type liquid crystal light valve according to this embodiment, and FIG. 2 is a sectional view along the line AA—AA of FIG. 1.

A pixel array region 4 on which display electrodes consisting, for example, of aluminum (Al) used as light reflecting films for each pixel, is formed on a silicon (Si) substrate 2, and a counter electrode 16 is formed on a counter substrate such as a glass substrate 14.

The silicon substrate 2 and the glass substrate 14 face to each other, and bonded using narrow wall of spacers 6, 8, 10 and 12 consisting of an adhesive resin formed in parallel outside immediate to the pixel array region 4.

Liquid crystals 18 are enclosed in the region between the pixel array region 4 and the counter electrode 16. Orientation films (not shown) are formed on the sides contacting the liquid crystals 18 of the pixel array region 4 and the counter electrode 16. No spacers are formed on the pixel array region 4.

On each of narrow wall of spacers 6–12 formed in parallel outside immediate to the pixel array region 4, a plurality of liquid crystal inlets 20, 22, 24 and 25 are provided. A sealant (not shown) is provided by the most external wall of spacers. The band spacers 6–12 of this embodiment are adopted to bond the upper and lower substrate in the outside of the pixel array region 4, and also to maintain the gap between the pixel array region 4 and the counter electrode 16 (cell gap) constant.

Since a plurality of resin spacers of wall are thus formed in the outside of the pixel array region 4, the prescribed cell gap may be maintained even if spacers are eliminated from the pixel array region 4, and therefore, a projection type liquid crystal display unit may be provided with enhanced display brightness and improved display qualities by preventing uneven or poor orientation to liquid crystal molecules.

The silicon substrate 2 used in the reflection type light valve of this embodiment is square with a side A of about 20 to 35 mm, and the pixel array region 4 is a square with a side B of about 15 to 30 mm, on which pixels are formed as a matrix of 1,600 rows by 1,280 columns. The thickness D, F and H of the spacers of wall is about 10 μm, their height I is about 3.2 μm, the distance between spacers C, E and G is about 10 μm, and the cell gap J is 3 μm.

The structure of the reflection type liquid crystal light valve of this embodiment will be described referring to FIG. 3 (not to scale).

A transistor 104 of which details are not shown is formed on a silicon substrate 100. A silicon oxide film 102 of a thickness of about 2 μm is formed over the silicon substrate 100 and the transistor 104, and a light absorbing layer 106 is formed over the silicon oxide film 102. A silicon nitride film 108 of a thickness of 5,000 Å is formed over the light absorbing layer 106, over which a light reflection layer 112 consisting of Al of a thickness of 1,500 Å is formed.

The light reflecting layer 112 is connected to the source electrode (not shown) of the transistor 104 by a tungsten (W) stud 110 buried in the through-hole formed through the silicon oxide film 102 and the silicon nitride film 108, and also functions as a display electrode for driving the liquid crystals. The subpixel of one display pixel is composed of one light reflecting film 112. No Al layer is formed between adjacent light reflecting films 112 (distance: about 1.7 μm), forming a black matrix 118 which is the light shielding region not to reflect light.

A protecting glass substrate 116 is formed as the counter substrate, and a counter electrode 114 is formed on the entire surface of the light reflecting film side of the protecting glass substrate 116. A prescribed cell gap is maintained between the light reflecting electrode 112 and the counter electrode 114, and liquid crystals are enclosed between them forming a liquid crystal layer 120.

The transistor 104 is an FET (field effect transistor) having a source electrode as well as a drain electrode (not shown) connected to the data line, and a gate electrode (not shown) connected to the scanning line, and functions as a switching element for supplying voltage impressed on the data line at the ON state of the gate to the light reflecting film 112 which is the display electrode.

By changing the transmissivity of the light by changing the orientation of liquid crystal molecules 122 corresponding to the voltage impressed between the light reflecting film 112 which is the display electrode and the counter electrode 114 when the transistor 104 is ON, the light incident from the protection glass substrate 116 is transmitted to the light reflecting film 112, where the light is reflected and emitted again from the protecting glass substrate 116, or the light in not transmitted, for performing display. In this drawing also, the orientation films are not shown.

Figure 4:
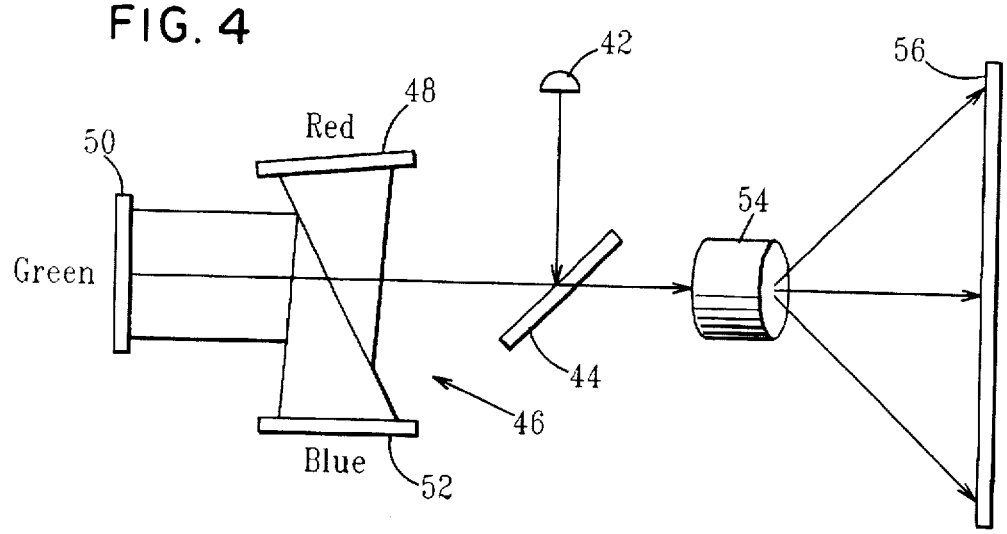
FIG. 4 is a diagram showing a projection type liquid crystal display unit using a reflection type liquid crystal light valve according to an embodiment of the present invention.
Figure 5:
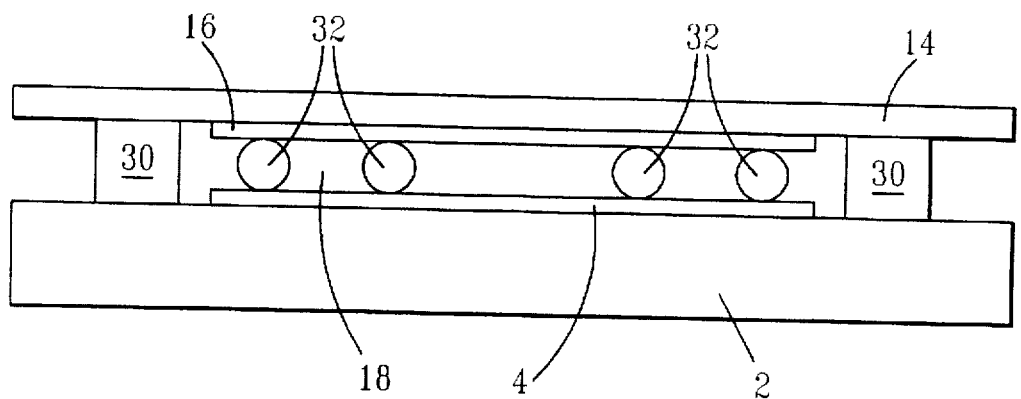
FIG. 5 is a sectional view showing a conventional reflection type liquid crystal light valve.
Figure 6:
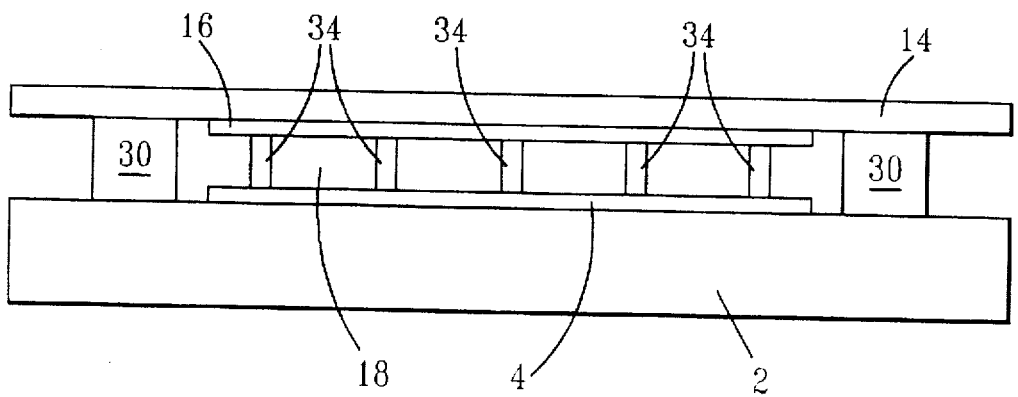
FIG. 6 is a sectional view showing a conventional reflection type liquid crystal light valve.

Next, the projection type liquid crystal display unit using the reflection type liquid crystal light valves according to this embodiment will be described referring to FIG. 4.

A linearly polarized light from the light source 42 is reflected by a polarized beam splitter 44 and incident to a color separation prism 46, where the light is separated into three primary colors, red (R), green (G) and blue (B), and incident to reflection type liquid crystal light valves 48, 50 and 52 for red (R), green (G) and blue (B). The light brightness modulated by each reflection type liquid crystal light valve for each subpixel is reflected and is incident to the color separation prism 46 again, which becomes linearly polarized light 90 degrees shifted from the original polarized light, and is incident to the polarized beam splitter 44. The light reflected from reflection type liquid crystal light valves 48, 50 and 52 passes through the polarized beam splitter 44, and is incident to the projection lens 54, enlarged, and projected on the screen 56.

Next, a method for the manufacture of the reflection type liquid crystal light valve of this embodiment will be described referring to FIGS. 5 to 8.

Since the reflection type liquid crystal light valve of this embodiment features resin spacers of narrow wall 6 to 12 formed in the outside immediate to the pixel array region 4, and as a rule, other structures may be manufactured by the conventional manufacturing method, the method for forming band spacers 6 to 12 in detail, and the method for forming other structures is not described.

First, the material for the spacers of narrow wall 6 to 12 is a resin material having both photosensitivity and adhesiveness. The resin material having both photosensitivity and adhesiveness is a mixture of a negative photoresist and a hardening agent in a certain ratio. For example, a material in which TPAR N-25 MB (main component) and TPAR-Hardening Agent, both available from Tokyo Ohka, are mixed in a ratio of 30.6:6 (see K. Matsui, K. Utsumi, H. Ohkubo and C. Sugitani, "Resin and Flexible Metal Bumps for Chip-On-Glass Technology", 43rd Electronic Components and Technology Conference, pp. 205–210, Orlando, Fla., June, 1993). In the above reference, a resin having photosensitivity and adhesiveness is used in the Chip-On Glass (COG) technology for directly connecting a driver chip of a liquid crystal display unit with a distance between electrodes of several ten microns to a glass substrate of a liquid crystal display unit wired by a transparent conductive film, and its excellent photosensitivity and adhesiveness are demonstrated.

In general, photosensitive, adhesive resins are advantageous in that they have various states from a tacky state to a completely cured state depending on conditions of light irradiation and heating. By utilizing these characteristics, the adhesion process may be divided into two steps of precure adhesion, which is a semi-cured state, and postcure, which is a completely cured state, making rework and repair possible. In the rework of photosensitive films, since the adhesiveness is variable, rework/repair after temporary bonding may be performed for controlling the cell gap accurately.

Next, the process for forming the above resin material on a silicon substrate, and bonding to a glass substrate will be described.

First, a mixed solution of a main component and a hardening agent in a certain ratio (for example, a material in which TPAR N-25 MB (main component) and TPAR-Hardening Agent, both available from Tokyo Ohka, are mixed in a ratio of 30.6:6) is applied to the silicon substrate by spinning at 1,500 rpm to a thickness of 3.0 µm. Next, after the silicon substrate is pre-baked on a hot plate at 90° C. for 3 minutes, it is exposed to a dose of 75–150 mJ/cm$^2$ by mirror projection. After exposure, the silicon substrate is developed by immersion and agitation using a developer (5% triethanolamine) at 25° C. for 50 seconds, and patterned to form desired spacers of wall.

After heated on the hot plate at 80° C. for 2 minutes, the spacers formed on the silicon substrate is compressed and bonded to the glass substrate under the conditions of 1 kg for 30 minutes. Next, post-baking is performed as required on the hot plate at 150° C. for 30 minutes, or ultraviolet (UV) irradiation at 2–3 J/cm$^2$.

Narrow wall of spacers formed under the above process conditions have a width of 10 µm. In addition, the distance (pitch between the spacers formed in parallel are 10 µm, and the thickness of the spacers is 3 µm. By changing exposure energy, the gradient of the walls of the band spacers may be changed. These spacers have been observed using a scanning electron micrograph (SEM) where the spacers were exposed at 75 mJ/cm$^2$, and scanning electron micrograph (SEM) of spacers exposed at 100 mJ/cm$^2$ have also been observed. With increase in exposure dose, the gradient of the wall becomes larger.

The SEMs of these spacers formed on the silicon substrate, and bonded to the glass counter substrate by compressing and heating have also been observed.

Thus, a number of narrow wall of spacers may be formed in parallel outside immediate to the pixel array region 4. Since desired patterns may by formed freely by utilizing photosensitivity, and multiple spacers may be arranged by utilizing adhesiveness, a sufficient mechanical strength is obtained. In the case of the above example, the peel strength of a spacer was 5 MPa (5 kgf/cm$^2$). The variation of the cell gap between surfaces was 3 µm±3% (900 Å), and cell gap of high precision was achieved by avoiding the warping of glass, which depends on the thickness and the total area of the glass.

The adhesion strength of the spacers may be varied within the range between 0.1 and 1.5 MPa by varying the heating temperature within the range between 50° C. and 160° C. and by varying the compression pressure within the range between 0.4 kg/cm$^2$ and 5.5 kg/cm, or by irradiating 2J/cm$^2$ or more ultraviolet rays.

In the above embodiment, the pitch of the spacers, for example, was 10 µm, these values may be changed by changing the mask pattern.

According to this embodiment, since the thickness and the uniformity over the substrate surface of the thin resin layer may be processed easily at a high accuracy as in the processing of photoresist, the cell gap may be controlled in high precision.

Since this thin resin film has a high adhesiveness, the base material is not limited to an insulator film such as a silicon oxide film, metals, ITO (indium-tin oxide) used as a transparent electrode, or glass may be used, and the thin resin film may be formed either on the array substrate side or on the counter substrate side.

Furthermore, since a sufficient mechanical strength is obtained by arranging the narrow wall of spacers in parallel outside of the pixel arrays, no spacers exist over the pixel arrays, enabling the cell gap to be controlled accurately. Since the disturbance of liquid crystal orientation due to the presence of spacers on pixel arrays may be eliminated, problems caused by conventional columnar spacers are solved.

To summarize the feature of the method for the manufacture of narrow wall of spacers according to this embodiment, the requirement of width and thickness of micron orders and demand for the process accuracy of one-tenth of the width and thickness may be achieved by the process using the photolithography process, and the requirement of maintaining a sufficient mechanical strength between two substrates of 20–30 mm by 20–30 mm was met by the adhesiveness of the spacers. To achieve this, a resin having both photosensitivity and adhesiveness is adopted as the material for forming spacers, and a number of spacers of narrow wall are arranged in parallel outside of the pixel array region.

The present invention is not limited to the above embodiment, but various variations may be devised.

For example, although the present invention is applied to a reflection type liquid crystal light valve of Si-LCD used in projection type liquid crystal display unit in the above embodiment, the present invention may be applied to other type of liquid crystal display units, such as transmission type liquid crystal light valves, or liquid crystal display units in which pixel regions are formed on a glass substrate.

Figure 3:
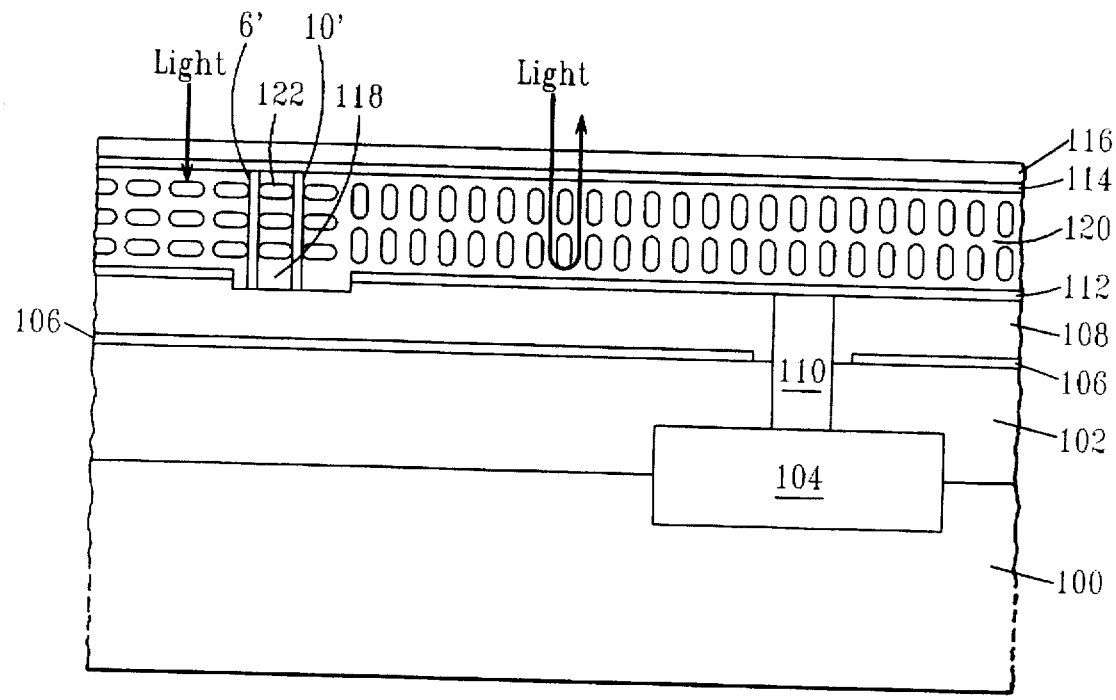
FIG. 3 is a sectional view showing a reflection type liquid crystal light valve according to an embodiment of the present invention.

As shown in FIG. 3, spacers 6', 10' having a smaller width than the width of the black matrix 118 may be formed on the region of the black matrix 118 in the pixel array region 4. In this case, although the effect of the above embodiment is reduced, the display qualities are still improved over conventional spacers.

As described above, according to the present invention, a liquid crystal display unit with the improved accuracy and uniformity between substrate surfaces of the cell gap is provided.

Also, according to the method for the manufacture of a semiconductor device of the present invention, the cell gap may easily be controlled.

While the invention has been particularly shown and described with respect to preferred embodiments thereof, it will be understood by those skilled in the art that the foregoing and other changes in form and details may be made therein without departing from the spirit and scope of the invention.

DESCRIPTION OF SYMBOLS

2 ... Silicon substrate
4 ... Pixel array region
6, 8, 10, 12 ... Narrow wall of spacers
14 ... Glass substrate
16 ... Counter electrode
18 ... Liquid crystals
20, 22, 24 ... Liquid inlets
30 ... Sealant
32 ... Spacer beads
34 ... Columnar spacers
42 ... Light source
44 ... Polarized beam splitter
46 ... Color separation prism
48, 50, 52 ... Reflection type light valve
54 ... Projection lens
56 ... Screen
100 ... Silicon substrate
102 ... Silicon oxide film
104 ... Transistor
106 ... Light absorbing layer
108 ... Silicon nitride film
110 ... Stud
112 ... Light reflecting film
114 ... Counter electrode
116 ... Protection glass substrate
118 ... Black matrix
120 ... Liquid crystal layer

Having thus described my invention, what I claim as new, and desire to secure by Letters Patent is:

1. A liquid crystal display unit comprising:

a substrate having a plurality of display electrodes, on which a pixel array region having light shielding regions between said display electrodes, a transparent counter substrate on which a transparent electrode facing to said pixel array region is formed, and spacers formed in said light shielding regions on said substrate in a width smaller than the width of said light shielding regions, and adapted to bond said substrate to said transparent counter substrate maintaining a prescribed cell gap.

2. A liquid crystal display unit according to claim 1, wherein said spacers are formed as a plurality of narrow walls in parallel.

3. A liquid crystal display unit according to claim 1, wherein said spacers are formed of a photo sensitive material having adhesive properties.

4. A liquid crystal display unit according to claim 1, wherein said substrate is a silicon substrate, and said display electrodes are formed of a light reflecting material.

* * * * *

UNITED STATES PATENT AND TRADEMARK OFFICE
CERTIFICATE OF CORRECTION

PATENT NO. : 5,777,713
DATED : July 7, 1998
INVENTOR(S) : Atsuo Kimura

It is certified that error appears in the above-identified patent and that said Letters Patent is hereby corrected as shown below:

Column 6, line 28: "(pitch" should read --(pitch)--

Column 6, line 55: "kg/cm" should read --$kg/cm^2$--

Signed and Sealed this

Seventh Day of September, 1999

Attest:

Q. TODD DICKINSON

Attesting Officer     Acting Commissioner of Patents and Trademarks